United States Patent
Sander et al.

(10) Patent No.: US 9,096,021 B2
(45) Date of Patent: Aug. 4, 2015

(54) METHOD AND SHAPING DEVICE FOR PRODUCING A COMPOSITE FIBER COMPONENT FOR AIR AND SPACE TRAVEL

(75) Inventors: Peter Sander, Bremen (DE); Hauke Lengsfeld, Helmste (DE); Hans Marquardt, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 584 days.

(21) Appl. No.: 12/989,813

(22) PCT Filed: Mar. 13, 2009

(86) PCT No.: PCT/EP2009/052980
§ 371 (c)(1),
(2), (4) Date: Apr. 29, 2011

(87) PCT Pub. No.: WO2009/132892
PCT Pub. Date: Nov. 5, 2009

(65) Prior Publication Data
US 2011/0308714 A1    Dec. 22, 2011

Related U.S. Application Data

(60) Provisional application No. 61/125,988, filed on Apr. 30, 2008.

(30) Foreign Application Priority Data

Apr. 30, 2008  (DE) .......................... 10 2008 001 498

(51) Int. Cl.
*B29C 70/08*  (2006.01)
*B29C 70/44*  (2006.01)
(Continued)

(52) U.S. Cl.
CPC ................. *B29C 70/44* (2013.01); *B29C 33/30* (2013.01); *B29C 70/443* (2013.01); *B29C 70/46* (2013.01);
(Continued)

(58) Field of Classification Search
CPC ...... B29C 33/30; B29C 70/44; B29C 70/443; B29C 70/46; B29C 70/54; B29C 2043/3644; B29C 2043/3649; B29C 43/3607

USPC .................................................. 156/243, 459
See application file for complete search history.

(56) References Cited

U.S. PATENT DOCUMENTS 5,190,773 A     3/1993  Damon
6,866,738 B2 *  3/2005  Sato .............................. 156/222
(Continued)

FOREIGN PATENT DOCUMENTS

DE    601 04 046 T2    10/2004
DE    600 09 259 T2    12/2004
(Continued)

OTHER PUBLICATIONS

Examination Report of German Priority Application No. 10 2008 001 498.2-16.

*Primary Examiner* — Philip Tucker
*Assistant Examiner* — Vicki Wu
(74) *Attorney, Agent, or Firm* — Greer, Burns & Crain Ltd.

(57) ABSTRACT

A forming tool with a predefined mold portion is provided in a method for producing a reinforced fiber composite component for aviation and aerospace. A forming/support element is molded by means of the mold portion of the forming tool. A semi-finished fiber product is then deposited at least in portions on the shaped forming/support element. The deposited semi-finished fiber product is deformed by means of the forming/support element to form at least one reinforcing portion. The forming/support element is then removed from the forming tool together with the reinforcing section formed on this element, followed by defined positioning of the reinforcing section thus formed with respect to an associated fiber composite component portion by supporting with the forming/support element. The reinforcing portion is cured to form the reinforced fiber composite component. A forming device is provided with a predefined mold portion which holds a forming/support element such that it can be removed.

9 Claims, 4 Drawing Sheets

(51) Int. Cl.
  *B29C 33/30* (2006.01)
  *B29C 70/46* (2006.01)
  *B29C 70/54* (2006.01)
  *B29D 99/00* (2010.01)
  *B29K 707/04* (2006.01)
  *B29L 31/00* (2006.01)
  *B29L 31/30* (2006.01)

(52) U.S. Cl.
  CPC ............ *B29C 70/54* (2013.01); *B29D 99/0003* (2013.01); *B29D 99/0014* (2013.01); *B29K 2707/04* (2013.01); *B29L 2031/003* (2013.01); *B29L 2031/3076* (2013.01); *Y02T 50/433* (2013.01)

(56) References Cited

U.S. PATENT DOCUMENTS

| | | | |
|---|---|---|---|
| 2004/0113315 A1* | 6/2004 | Graham | 264/266 |
| 2007/0175171 A1* | 8/2007 | Delgado et al. | 52/741.1 |
| 2009/0166921 A1* | 7/2009 | Jacob et al. | 264/219 |
| 2010/0314807 A1* | 12/2010 | Lengsfeld et al. | 264/571 |

FOREIGN PATENT DOCUMENTS

| | | |
|---|---|---|
| EP | 1134070 | 9/2001 |
| EP | 1537982 | 6/2005 |
| JP | 2001310798 A * | 11/2001 |

* cited by examiner

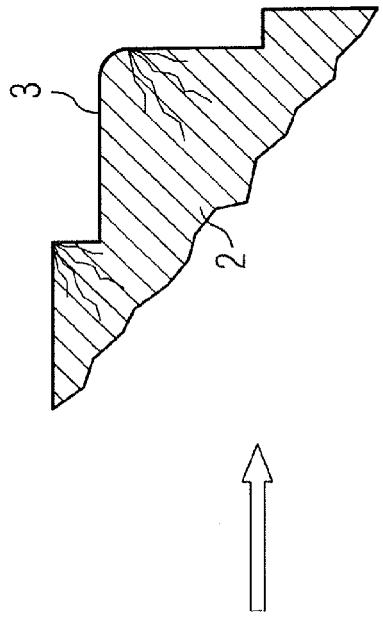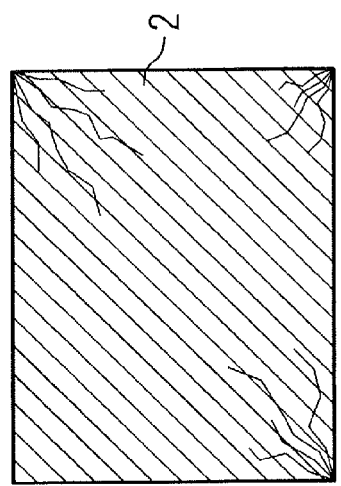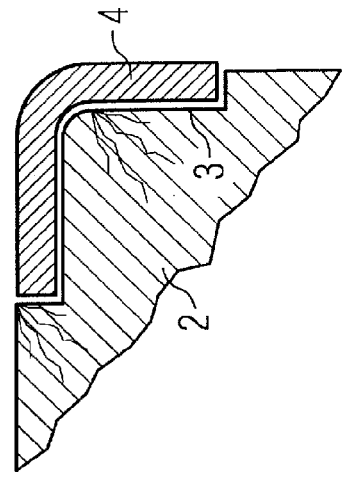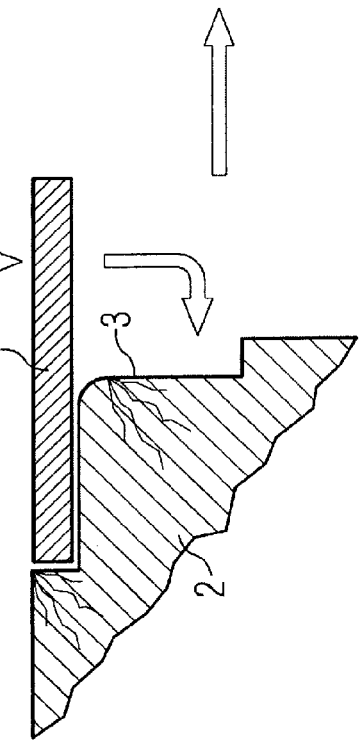

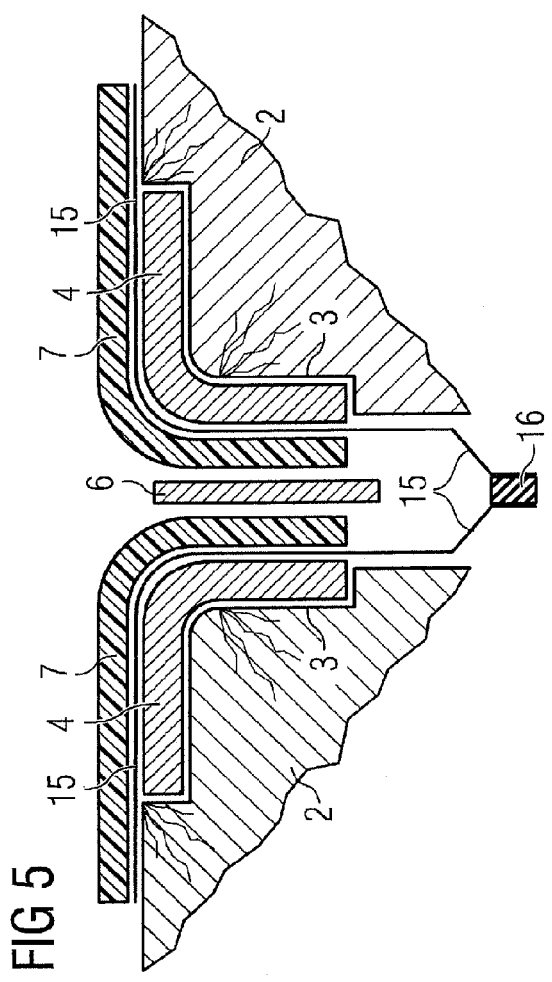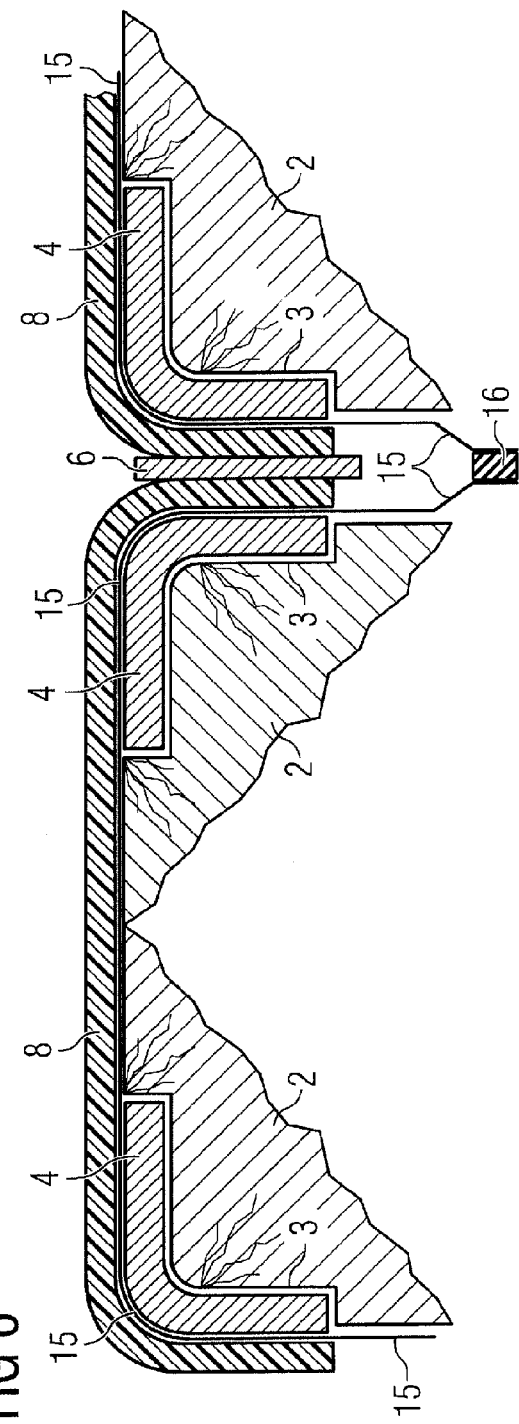

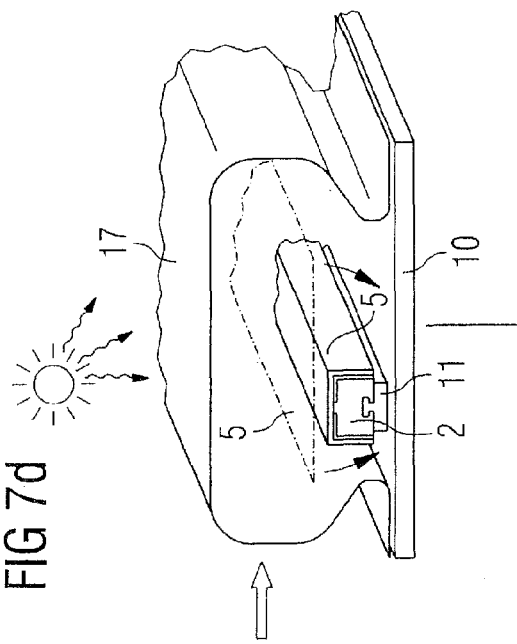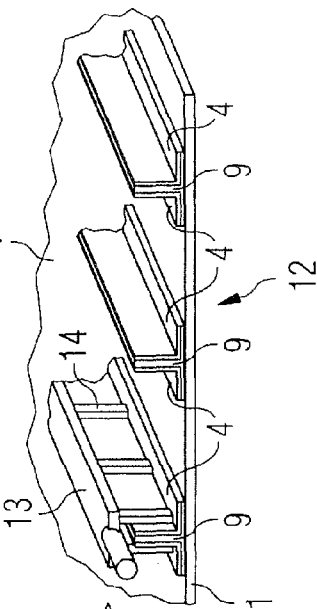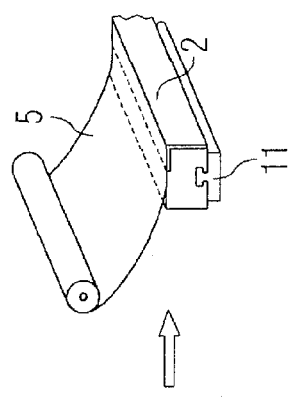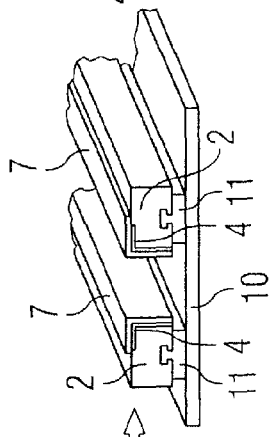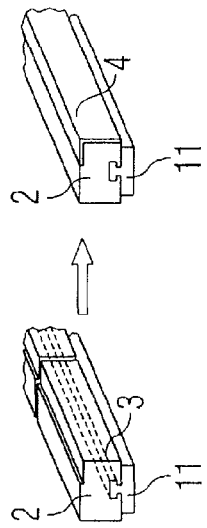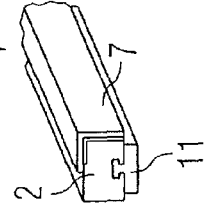

METHOD AND SHAPING DEVICE FOR PRODUCING A COMPOSITE FIBER COMPONENT FOR AIR AND SPACE TRAVEL

CROSS-REFERENCE TO RELATED APPLICATIONS

This application claims the benefit of U.S. Provisional Application No. 61/125,988, filed Apr. 30, 2008 and German Patent Application No. 10 2008 001 498.2, filed Apr. 30, 2008, the entire disclosures of which are herein incorporated by reference.

FIELD OF THE INVENTION

The present invention relates to a method for producing a fibre composite component for aviation and aerospace and to a forming device for producing such a fibre composite component by means of such a method.

Although it can be used with any fibre composite components, the present invention and the problems underlying the invention are explained in greater detail below with reference to sheet-like, stringer-reinforced carbon fibre plastics material (CFRP) components, for example aircraft skin shells.

The art of reinforcing CFRP skin shells with CFRP stringers is widely known with a view to withstanding the high loads generated in the field of aviation with as little extra weight as possible. Different types of stringers are used for this purpose, for example T and Ω stringers.

The cross-section of T stringers consists of the base and the web. The base is the surface which is connected to the skin shell. The use of T stringer-reinforced skin shells is widespread in aircraft construction.

Skin shells with stringers are, for example, produced using an infusion process incorporating a matrix, for example an epoxy resin, in semi-finished fibre products. Semi-finished fibre products include woven fabrics, non-woven fabrics and fibre mats. These are equipped with the matrix and then cured in an autoclave for example. Infusion processes can be more economical than other known methods of producing fibre composite components, such as, for example, the prepreg process, because this allows more economical semi-finished fibre products to be used.

When developing new aviation and aerospace vehicle components, there are often many iteration stages until the optimum component geometry is found. This has an impact on the geometry of manufacturing equipment, with the result that adaptation of the finished series tools cannot be avoided.

As things stand at present, the production of manufacturing equipment and tools for the production of CFRP components is often extremely time-consuming and costly due to the materials and production processes used. This will become clear by considering an example. When developing and producing new stringer-reinforced panels, such as, for example, rudder unit shells, it is possible that the laminate thicknesses of the base skin or stringers will have to be adapted due to high loads. If there are any ramps in the stringer, these must also be adapted due to the different laminate thicknesses, e.g. in the base skin. It is thus also necessary to adapt the tools used to manufacture the stringers.

When manufacturing stringers, e.g. using a so-called Hot-Form process, and subsequently processing the stringers in a setting and curing process on a panel, individual tools are currently used for each process, which leads to correspondingly high demands in terms of time, parts and costs.

Document DE 600 09 259 T2 describes a manufacturing process for composite material components in which at least one uncured strut is adhered to a hardened base component by means of a structural bonding agent. This bond is produced by shaping and applying pressure using tools specially designed for this purpose, with the result that it is possible to control and retain the resin and the flow of bonding agent generated during the autoclave cycle.

Document DE 601 04 046 T2 describes a method for producing an intermediate product from a fibre-reinforced composite material. This method includes the production of a semi-cured intermediate product with a hardness level of 1 to 50% from a fibre-reinforced composite material which comprises a reinforcing fibre impregnated with a heat-curing resin.

In the light of the above, the object of the present invention is to provide a more economical method and a more economical forming device for producing a fibre composite component for aviation and aerospace.

SUMMARY OF THE INVENTION

One concept underlying the present invention entails providing a forming tool with a mould portion for shaping a forming/support element, the forming/support element being used to form a reinforcing portion or reinforcing element and remaining with and supporting the reinforcing portion when removing from the forming tool, positioning and curing.

Accordingly, a method for producing a fibre composite component for aviation and aerospace is provided, initially providing a forming tool with a predefined mould portion. A forming/support element on which a semi-finished fibre product is deposited, or at least on portions thereof, is shaped by means of the mould portion of the forming tool. The deposited semi-finished fibre product is formed by means of the forming/support element to form at least one reinforcing portion, after which the forming/support element is removed from the forming tool together with the reinforcing portion formed on this element. The reinforcing portion thus formed is then positioned in a defined manner with respect to an associated fibre composite component portion supported by the forming/support element. The reinforcing portion is then cured to form the reinforced fibre composite component.

A forming device for such a fibre composite component for aviation and aerospace is also provided with a forming tool which has a predefined mould portion and a forming/support element which is held in the mould portion of the forming tool such that it can be removed.

The present invention thus has the advantage over the methods mentioned above that the die used to form the reinforcing section or stringer, e.g. in the HotForm process, i.e. the forming/support element, can also be used at the same time in the subsequent setting and curing process. This thus saves time and expense.

Advantageous embodiments and improvements of the present invention are described in the sub-claims.

The forming tool is produced from the geometric data for a reinforcing element or portion, e.g. a stringer, for a forming/support element, e.g. a sheet, which reproduces the geometry of the subsequent component (e.g. stringer). In this process the forming tool, which may for example, be made from wood, is milled until a mould portion for deforming the forming/support element is obtained. The resulting sheet then has a profile which may, for example, be an L or U-shaped profile. The sheet may, for example, be made from steel or aluminium, but also from a fibre composite material or a combination of the above-mentioned materials.

The resulting shaped forming/support element can now be used simultaneously as a forming surface for the reinforcing portion in the subsequent HotForm process. It can remain on the forming tool during this operation. It is also possible to use not only the forming/support element, but also the forming tool, e.g. part of its surface, for depositing the semi-finished fibre product.

After the hot forming of the reinforcing portion, the forming/support element together with the reinforcing portion on the element is removed from the forming tool, with the forming/support element acting as a support element for the reinforcing portion setting process for the subsequent curing process as well. The forming/support element is then removed from the cured reinforcing portion and replaced on the mould portion of the forming tool, thus permitting it to be used again.

During the forming process of the deposited semi-finished fibre product, it is also possible to apply the vacuum film required for the subsequent curing process beneath the semi-finished fibre product to be deposited, on the forming/support element, and also on the surface of the forming tool used for this purpose, producing a separating element which enables the moulding/support element and the forming tool to be separated from the reinforcing portion.

This also makes it possible for the forming/support element to be left outside the vacuum area during the curing process. As a result of this procedure, economical metal sheets (steel, aluminium) can be used here. Thermal expansion of the metal profile in the longitudinal direction does not have a negative impact on the geometry of the reinforcing portion or stringer in this case, since the forming/support element can move freely. An expensive tool material such as for example Ni-36 is thus not required in this instance.

An additional separating element, e.g. a corresponding coating, may of course also be used to achieve separation, and such a coating can also be used without a separation film.

If the semi-finished fibre product or laminate structure now needs to be adapted, e.g. for static reasons, the geometric contour of the reinforcing element, i.e. the forming/support element, changes. The geometry of the profiled sheet or forming/support element as a forming tool for the semi-finished fibre product and the geometry of the original mould, i.e. of the forming tool for forming and formation of the forming/support element must thus be re-adapted to each individual case, i.e. remade.

The forming tool may be manufactured from an economical material, e.g. meranti wood, as the profiled sheet requires simple sheet forming, for example. The same tool material can also be used to construct a forming and curing tool, i.e. a forming/support element, from CFRP. As they have the same thermal expansion behaviour as the material to be cured, i.e. the stringer or reinforcing portion in this case, such CFRP tools have the advantage that they can also be used for awkward geometries (e.g. ramps, undercuts). On the other hand, sheet metal profiles can only be used for simple geometries (without ramps or only with small ramps).

The forming/support element formed with the forming tool can also be joined to another forming/support element formed using another forming tool in one embodiment of the invention in order to form a composite reinforcing profile profiled part. If, for example, the individual forming/support elements formed have an L-shaped profile, they can be joined to form a stringer with a T-shaped profile, with the forming tools also acting as supports and pressure tools.

This is also the case with U-shaped profiles, which can be joined among one another.

Alternatively, it is also possible to divide a U-shaped profile thus formed along its length on the forming tool in order to create two L-shaped profiles.

It is also proposed that the forming/support element together with the reinforcing portion formed on this element should be removed from the forming tool and the position should be defined by means of a handling device. The forming/support element can be designed to interact with the handling device, e.g. with an engaging device. The handling device may alternatively have suction grippers, for example.

BRIEF DESCRIPTION OF THE DRAWINGS

The invention is explained below in greater detail on the basis of embodiments and with reference to the attached figures in the drawings.

FIG. 1a-1b show an embodiment of a forming tool with a mould portion;

FIG. 2a-2b show an embodiment of the formation of a forming/support element with the forming tool as per FIG. 1b;

FIG. 5 shows the embodiment of FIG. 3 with a separating element;

FIG. 6 shows the embodiment of FIG. 4 with a separating element; and

FIG. 7a-h are schematic diagrams showing stages in an embodiment of a method according to the invention and a forming device according to the invention for producing a fibre composite component for aviation and aerospace.

DESCRIPTION OF EXEMPLARY EMBODIMENTS

Figure 3:
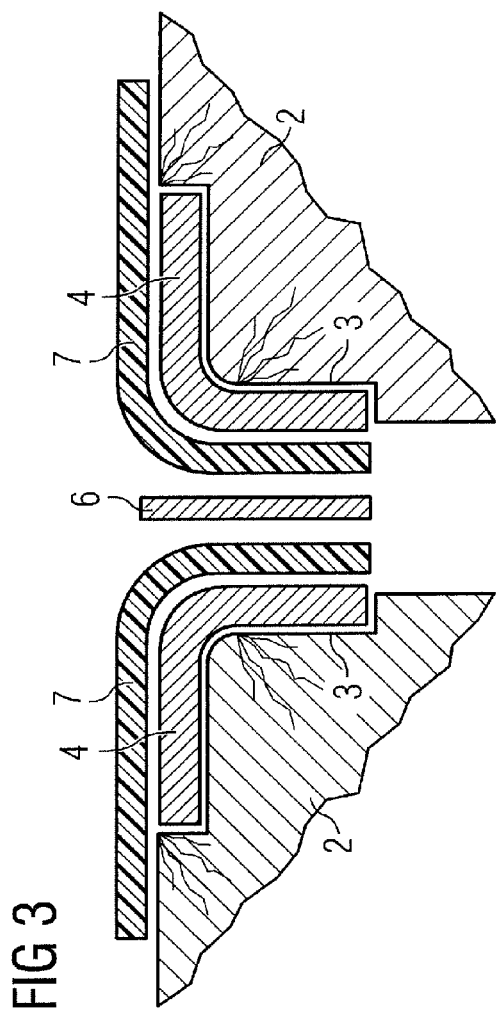
FIG. 3 shows an embodiment of the formation of a T-shaped profile from two reinforcing portions with L-shaped profiles.

In all figures in the drawing, the same elements or elements serving the same function are shown with the same reference numerals—unless otherwise specified.

FIGS. 1a and 1b show an embodiment of a forming tool 2 with a mould portion 3. In this example, the forming tool 2 is a portion made from wood with a defined length and a rectangular cross-section (only the cross-section is shown). The forming tool 2 may also be made from a different material, steel for example. One edge (or more edges) of the forming tool 2 is (are) provided with recesses using a machining method, e.g. milling (other methods are also conceivable, as are casting methods), these recesses forming a mould portion 3 which extends over part or the entire length of the forming tool 2.

With the aid of the mould portion 3, a forming/support element 4 is deformed in a suitable fashion, as shown by arrows, such that it assumes the shape of the mould portion 3. To this end, FIG. 2a shows the forming/support element 4 in its initial position and FIG. 2b shows it in a deformed position. In this example, the forming/support element 4 is a metal sheet which corresponds in thickness to the depth of the recess in the mould portion 3, with the result that the surfaces of the deformed forming/support element 4 run substantially level with the corresponding surfaces of the forming tool 2. The deformed forming/support element 4 has an L-shaped profile cross-section in this example.

We now refer to FIGS. 7a to 7h simultaneously, these representing schematic illustrations of stages in an embodiment of a method according to the invention and a forming device according to the invention for producing a fibre composite component 1 for aviation and aerospace.

The shaped forming/support element 4 remains in the mould portion 3 of the forming tool 2 and forms a forming tool for a semi-finished fibre product 5 (see FIG. 3 and FIG. 7a,b). In a subsequent stage, semi-finished fibre products 5 are deposited and shaped on the forming/support element 4 in such a way that they surround the forming/support element 4 and are adapted to its shape (FIG. 7c).

A variety of manufacturing methods can be used to process the composite fibre material in the semi-finished fibre products 5, such as a HotForm process for example. The so-called vacuum infusion process is preferably selected in this instance. However, the prepreg process is also just as applicable here.

In this process, the forming tool 2 with the forming/support element 4 in the mould portion 3 on this mould, the semi-finished fibre products 5 being deposited on this element, is cured beneath a vacuum film device 17, e.g. in an autoclave under the effects of heat (see sun symbol in FIG. 7d) and pressure in a curing cycle, thus producing a reinforcing portion 7 (FIG. 7e).

This reinforcing portion 7 has an L-shaped profile in this example and can be used as an L-shaped stringer to reinforce a fibre composite component 1, as described in greater detail below.

To this end, FIG. 3 depicts an embodiment showing the formation of a composite reinforcing portion 9 with a T-shaped profile made from two reinforcing portions 7 with L-shaped profiles.

FIG. 3 shows two forming tools 2 in partial section. They have their longitudinal sides facing each other (see FIG. 7f) and one forming/support element 4 is held in each of their respective mould portions 3, this being used to shape a deposited semi-finished fibre product 5 and form a reinforcing portion 7 with an L-shaped profile respectively (see FIG. 7c-7f). In this example, the reinforcing portions 7 are located on the top side (long side of the L-shaped profile), not only on the forming/support element 4, but also on part of the surface of the forming tool 2. The short sides of the connecting portions 7 with an L-shaped profile face each other with a blade located between them for additional reinforcing in this example (a blade is not provided in FIG. 7f).

By pressing together the longitudinal sides of the forming tools 2, the short sides of the reinforcing portions 7 with an L-shaped profile are joined together in a suitable manner, thus forming a reinforcing portion 9 with a T-shaped profile, the base of which consists of the long sides of the individual reinforcing portions 7 with an L-shaped profile and is upside down.

Figure 4:
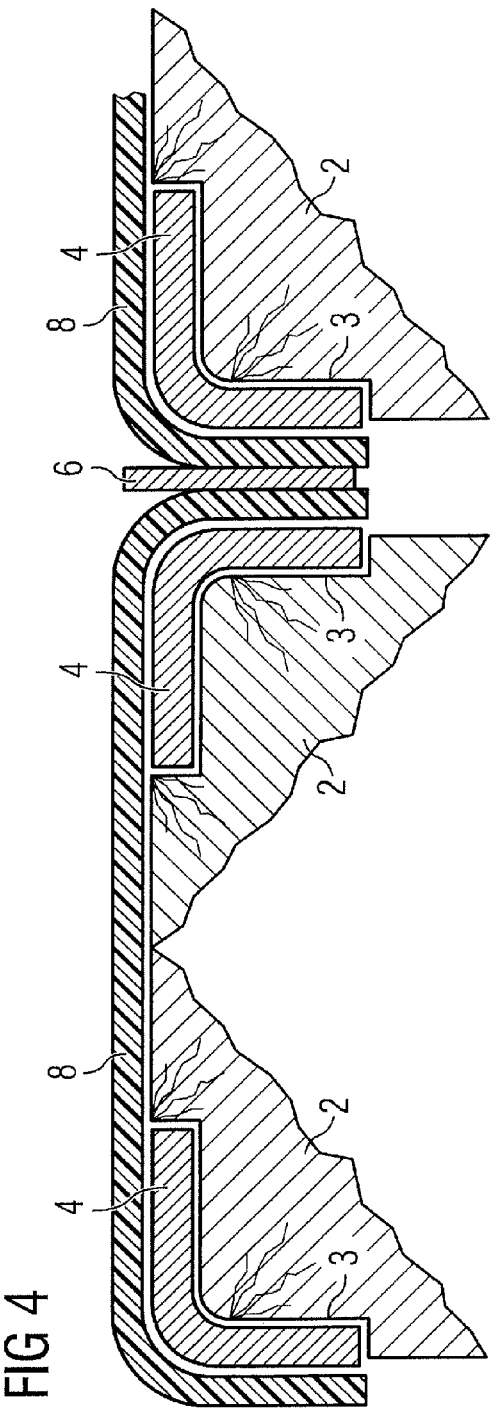
FIG. 4 shows a further embodiment of the formation of a composite reinforcing portion made from two reinforcing portions with U-shaped profiles.

FIG. 4 depicts a further embodiment showing the formation of a composite reinforcing portion made from two reinforcing portions 8 with U-shaped profiles. The U-shaped profile is formed by depositing and correspondingly deforming the semi-finished fibre products (FIG. 7c) over the surfaces of the forming tool 2 and the forming/support elements 4 which in this example are held in mould portions 3 incorporated on two opposite longitudinal edges of the forming tool 2. In FIG. 4, the reinforcing portions 8 are deformed as described under FIG. 3. FIG. 4 (and FIG. 7f) show that the short sides of the reinforcing portions 8 with a U-shaped profile are joined together when the forming tools are pressed together, and a blade 6 is also provided in this instance. Two or more U-shaped profiles thus joined may be used to form a fibre composite component.

However, it is also possible for the reinforcing portions 8 with a U-shaped profile to be divided in their longitudinal direction, leading to two reinforcing portions 7, each with an L-shaped profile, which can be joined together as explained above to make a reinforcing profiled part 9 with a T-shaped profile (see FIGS. 7g, h). The length of the respective profile side can be determined by the width of the profile of the forming tool 2 and of the respective forming/support element 4.

It is also possible to locate a separating element 15 between the semi-finished fibre product 5 and the shaping forming/support element 4 or the forming tool 2, as illustrated in FIG. 5 in an embodiment similar to FIG. 3. The separating element 15 in this instance is a vacuum film which makes it possible to keep the forming/support element 4 separate from the reinforcing portion 7, 8, 9 during subsequent curing (FIG. 7h) in the setting and curing process (see below) and thus allows it to remain outside the vacuum area. Thus, as already mentioned above, this makes it possible to avoid the use of expensive tool materials.

The separating elements 15 are applied to each forming tool 2 and connected to each other in a sealed manner in this example by means of a sealing agent, 16, e.g. sealing putty.

FIG. 6 shows the use of separating elements 15 in the case of reinforcing portions 8 with a U-shaped profile similar to FIG. 4. The explanation for FIG. 5 also applies here.

FIGS. 7a to 7h are schematic illustrations showing stages in an embodiment of a method according to the invention and a forming device according to the invention for producing a fibre composite component 1 for aviation and aerospace.

The forming device has the forming tool 2 described above with the mould portion 3 which is also described above.

In this example, the forming tool 2 is shown in perspective in its longitudinal extension in FIGS. 7a to 7h. Here the forming tool 2 is held on a support element 11 with profiles which interact, e.g. dovetail profiles or similar. In FIG. 7b a mould portion 3 is provided with the deformed forming/support element 4. The semi-finished fibre product 5 is applied to the forming/support element 4 in FIG. 7c (and if necessary is also applied to the surface of the forming tool 2). In this process the forming/support element 4 acts as a forming element for the semi-finished fibre product 5 to form the reinforcing portion 7.

FIG. 7d is a schematic illustration of a HotForm process to cure or pre-cure the reinforcing portion 7. To this end, the forming tool 2 with the attached forming/support element 4 and the semi-finished fibre product 5 thus shaped is positioned with the support element 11 on a base plate 10 beneath a vacuum film device 17. A sun symbol is intended to show the effects of heat to cure or pre-cure the reinforcing portion 7.

The reinforcing portion 7 thus cured remains on the forming tool 2 with the forming/support element 4, as shown by FIG. 7e. In this example, in order to form a reinforcing portion 9 with a T-shaped profile, two forming tools 2 prepared as described above with reinforcing portions 7 are now positioned on the base plate 10, with the reinforcing portions 7 with an L-shaped profile facing each other (the long sides of the L-shaped profiles face each other in this situation). A composite reinforcing portion 9 with a T-shaped profile (FIG. 7f) is created by pressing together as explained above.

The reinforcing portion 9 thus formed, together with the forming/support elements 4, which now also act as support elements, are removed from the forming tools 2 in an appropriate manner, which is not shown in any greater detail, and turned using a handling device 13 which is only illustrated schematically with gripper elements 14 in FIGS. 7g and 7h. The reinforcing portion 9 together with the forming/support elements 4 on its two longitudinal sides is then transported on for positioning on a fibre composite component 1 to be reinforced, as illustrated schematically in FIG. 7h. Other reinforcing portions 9 with a T-shaped profile have already been positioned on the fibre composite component 1, e.g. a shell component of a rudder unit for an aircraft or spacecraft. They are also supported by respective forming/support elements 4 in their function as support elements. This so-called setting process is followed by a curing process (not illustrated), for example, similar to that shown in FIG. 7d.

In the case of separating elements 15 (see FIGS. 5 and 6), these are connected together in a sealed manner, with the forming/support elements 4 being located outside this vacuum area as mentioned above.

After curing the thus reinforced fibre composite component 1, the forming/support elements 4 are removed with the aid of the handling device and re-inserted in the mould portions 3 of the forming tools 2 used to allow them to be re-used.

The invention is not restricted to the specific method and forming device for producing a fibre composite component 1 for aviation and aerospace shown in the figures.

For example, the present inventive idea may also be applied to fibre composite components in the fields of sports equipment or motor sports.

Reinforcing portions 7, 8 and 9 may also be made in other profile shapes.

The forming tool 2 may also be made from a cast material.

The forming/support elements 4 can also be constructed from a composite fibre material, e.g. CFRP.

A forming tool 2 with a predefined mould portion 3 is provided in a method for producing a reinforced fibre composite component 1 for aviation and aerospace. A forming/support element 4 is moulded by means of the mould portion 3 of the forming tool 2. A semi-finished fibre product 5 is then deposited at least in portions on the shaped forming/support element 4. The deposited semi-finished fibre product 5 is deformed by means of the forming/support element 4 to form at least one reinforcing portion 7, 8, 9. The forming/support element 4 is then removed from the forming tool 2 together with the reinforcing section 7, 8, 9 formed on this element, followed by defined positioning of the reinforcing section 7, 8, 9 thus formed with respect to an associated fibre composite component section 12 by supporting with the forming/support element 4. The reinforcing section 7, 8 is cured to form the reinforced fibre composite component 1. A forming device is provided with a predefined mould portion 3 which holds a forming/support element 4 such that it can be removed.

LIST OF REFERENCE NUMERALS 1 fibre composite component
2 forming tool
3 mould portion
4 forming/support element
5 semi-finished fibre product
6 blade
7 reinforcing portion, L profile
8 reinforcing portion, U profile
9 reinforcing portion, T profile
10 base plate
11 support element
12 fibre composite component section
13 handling device
14 gripper element
15 separating element
16 sealing agent
17 vacuum film device

The invention claimed is:

1. A method for producing a reinforced fibre composite component for aviation and aerospace with the following steps:
   (i) providing a forming tool with a predefined mould portion, wherein the mould portion is formed at an edge region of the forming tool and comprises a first recess parallel to a width direction of the forming tool formed in a horizontal section of said forming tool and a second recess parallel to a height direction of the forming tool formed in a vertical section of said forming tool, a junction of said first and second recess being rounded;
   (ii) moulding a forming/support element comprising one of a metal material and a composite material by means of the mould portion of the forming tool, by bending the forming/support element around the mould portion, wherein said forming/support element corresponds in thickness to a depth of the first and second recess in the mould portion respectively and wherein an outer surface of the bent forming/support element runs level with adjacent surfaces of the forming tool;
   (iii) depositing a semi-finished fibre product at least in portions on the shaped forming/support element;
   (iv) moulding the deposited semi-finished fibre product by means of the forming/support element to form at least one reinforcing portion;
   (v) removing the forming/support element together with the reinforcing portion formed on this element from the forming tool;
   (vi) defined positioning of the reinforcing portion thus formed with respect to an associated fibre composite component portion by supporting with the forming/support element; and
   (vii) curing the reinforced portion to form the reinforced fibre composite component.

2. The method according to claim 1, wherein the semi-finished fibre product is deposited at least in portions on the formed forming/support element and on the forming tool.

3. The method according to claim 1, wherein a separating element is applied beneath the semi-finished fibre product before depositing the at least one semi-finished fibre product in portions.

4. The method according to claim 3, wherein the separating element is a vacuum film.

5. The method according to claim 1, wherein at least two reinforcing portions are joined together to form at least one composite reinforcing portion after deforming the deposited semi-finished fibre product.

6. The method according to claim 5, wherein a reinforcing portion is divided in the longitudinal direction to form two individual reinforcing portions.

7. The method according to claim 5, wherein the at least two reinforcing portions remain on the respective forming tool together with the forming/support elements during the joining process and are joined by pressing together the forming tools.

8. The method according to claim 1, wherein the forming/support element together with the reinforcing portion formed on this element are removed from the forming tool and the position is defined by means of a handling device.

9. The method according to claim 1, wherein the forming/support element is removed after forming the reinforced fibre composite component and replaced on the mould portion of the forming tool in order to be re-used.

* * * * *